United States Patent
Lin et al.

(10) Patent No.: US 8,078,779 B2
(45) Date of Patent: Dec. 13, 2011

(54) DATA TRANSMISSION METHOD FOR USE WITH WIRELESS MOUSE

(75) Inventors: Chien-Nan Lin, Taipei (TW); Chin-Lung Lai, Taipei (TW)

(73) Assignee: Primax Electronics Ltd., Taipei (TW)

( * ) Notice: Subject to any disclaimer, the term of this patent is extended or adjusted under 35 U.S.C. 154(b) by 161 days.

(21) Appl. No.: 12/634,848

(22) Filed: Dec. 10, 2009

(65) Prior Publication Data

US 2011/0082953 A1  Apr. 7, 2011

(30) Foreign Application Priority Data

Oct. 1, 2009  (TW) ................................ 98133346 A

(51) Int. Cl.
*G06F 3/03* (2006.01)
(52) U.S. Cl. ............................................. 710/73; 710/65
(58) Field of Classification Search ........................ None
See application file for complete search history.

(56) References Cited

U.S. PATENT DOCUMENTS

| | | | | |
|---|---|---|---|---|
| 6,965,369 B2* | 11/2005 | Rensberger | | 345/156 |
| 7,466,305 B2* | 12/2008 | Lin et al. | | 345/163 |
| 7,664,537 B2* | 2/2010 | Albulet et al. | | 455/574 |
| 2007/0030854 A1* | 2/2007 | Lin et al. | | 370/401 |
| 2007/0273650 A1* | 11/2007 | Wu et al. | | 345/163 |
| 2008/0204413 A1* | 8/2008 | Wu et al. | | 345/161 |
| 2009/0189860 A1* | 7/2009 | Su et al. | | 345/163 |
| 2009/0195505 A1* | 8/2009 | Chen et al. | | 345/166 |

* cited by examiner

*Primary Examiner* — Cheng-Yuan Tseng
(74) *Attorney, Agent, or Firm* — Kirton & McConkie; Evan R. Witt

(57) ABSTRACT

A data transmission method for use with a wireless mouse includes the following steps. Firstly, a mouse displacement data including a horizontal displacement and a vertical displacement is periodically transmitted from a wireless signal emitter to a wireless signal receiver in every wireless transmission time interval T1. Then, the horizontal displacement and the vertical displacement of the mouse displacement data are partitioned to acquire plural horizontal sub-displacements and plural vertical sub-displacements, respectively. Afterwards, one of the plural horizontal sub-displacements and one of the plural vertical sub-displacements are periodically transmitted from the wireless signal receiver to the computer system in every wired transmission time interval T2. By the data transmission method, the wired report rate is increased without largely increasing power consumption, and the moving trajectory of the wireless becomes smoother.

18 Claims, 6 Drawing Sheets

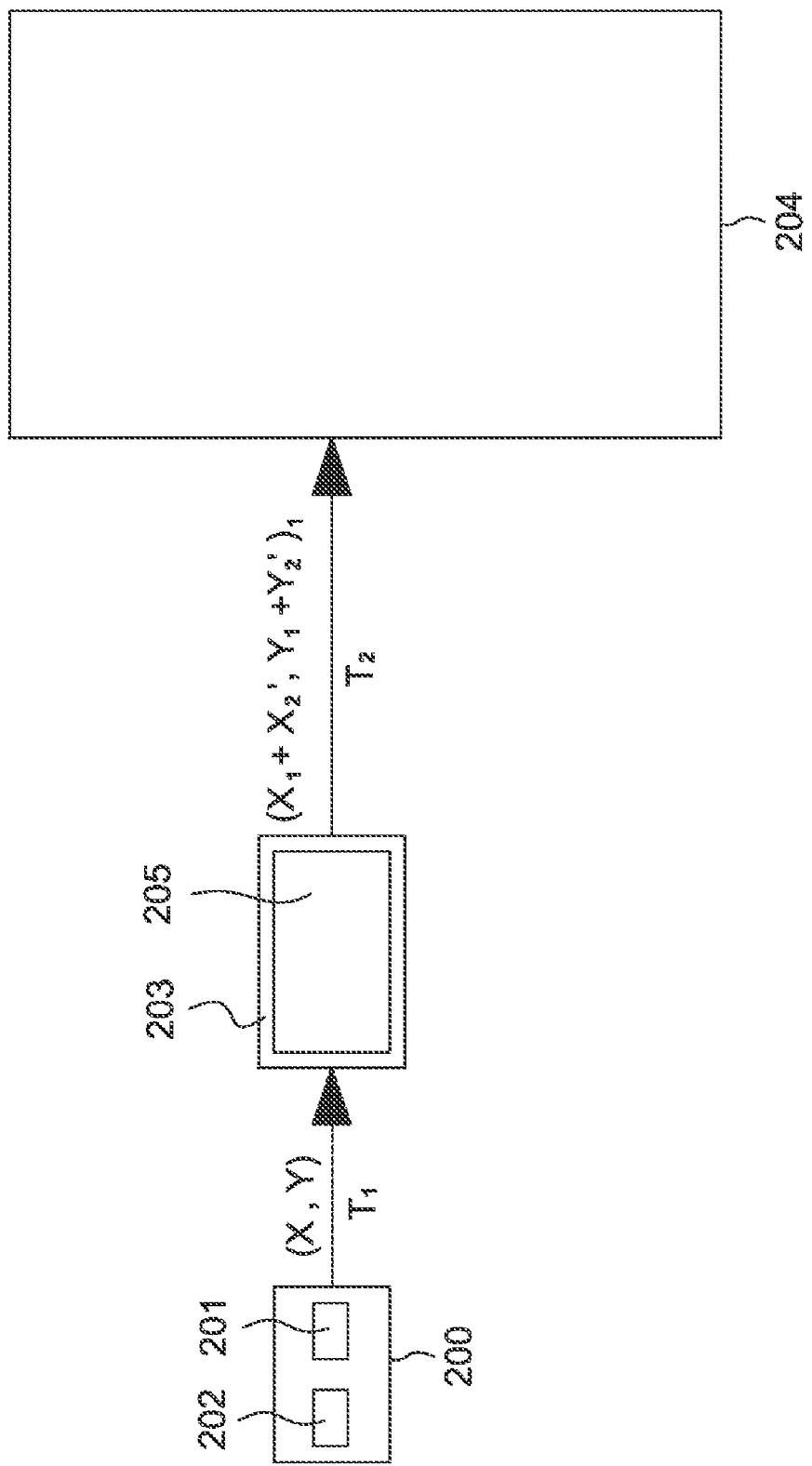

DATA TRANSMISSION METHOD FOR USE WITH WIRELESS MOUSE

FIELD OF THE INVENTION

The present invention relates to a data transmission method, and more particularly to a data transmission method for use with a wireless mouse.

BACKGROUND OF THE INVENTION

With rapid development of electronic and information industries, computers and the peripheral device thereof become essential parts in our daily lives. For example, mice are important peripheral devices of computers for establishing contact between the personal computers and the users. For helping the user well operate the computer, many novel mice (e.g. wireless mice) with expanded functions are developed in views of humanization and user-friendliness.

Conventionally, a mouse is in communication with a computer via wire linkage. The wire linkage is very troublesome and inconvenient. Instead of using the connecting wire, a corresponding wireless signal receiver is used for receiving wireless signals issued from the mouse body when the wireless mouse is operated. Since no additional connecting wire is required to connect the wireless mouse with the computer, the use of the wireless mouse is more convenient. In addition to the wireless mouse, other wireless peripheral devices such as wireless earphones, wireless keyboards and the like are in communication with the computer according to a wireless transmission technology. Among these wireless peripheral devices, the wireless mouse is very popular.

Although the wireless mouse is convenient because no signal wire is required, there are still some drawbacks. For example, when the wireless mouse is operated, a battery is required to provide electricity because no power may be supplied to the wireless mouse through a connecting port of the computer. Therefore, it is critical to extend the use time of the battery by reducing power consumption of the wireless mouse.

FIG. 1 is a schematic diagram illustrating wireless communication of a conventional wireless mouse. The wireless mouse 100 comprises a wireless signal emitter 101 and a control unit 102. The wireless signal emitter 101 could emit a wireless signal WS. A wireless signal receiver 103 is used for receiving the wireless signal WS. The wireless signal receiver 103 is in communication with the computer system 104 via a universal serial bus (USB). In response to a triggering operation of for example pressing down a click button, rotating the scroll wheel, horizontally moving the wireless mouse, vertically moving the wireless mouse and the like, the wireless mouse 100 will generate a corresponding mouse displacement data. Under control of the control unit 102, the mouse displacement data is converted into a displacement data packet. Next, the wireless signal WS containing the displacement data packet will be transmitted from the wireless signal emitter 101 to the wireless signal receiver 103. After receiving the wireless signal WS, the wireless signal receiver 103 transmits the displacement data packet to the computer system 104. By reading the mouse displacement data, the computer system can execute a function corresponding to the triggering operation of the wireless mouse 100.

For each triggering operation of the wireless mouse, the wireless mouse will generate a set of mouse displacement data. The user could input an instruction to control the computer system by the wireless mouse when the mouse displacement data corresponding to the instruction is transmitted to the computer system. As a consequence, the computer will execute the instruction. Generally, the mouse displacement data include for example horizontal mouse displacement data, vertical mouse displacement data, key clicking data, scroll wheel rotating data, and window horizontal scrolling data. During wireless transmission, the mouse displacement data are readily subject to interference from external noise, and thus damaged or erroneous data occur. For protecting data from being interfered by noise, the mouse displacement data should be converted into displacement data packets during wireless transmission. A typical displacement data packet includes for example a pilot code, a device ID code, a flag, a payload data and a cyclic redundancy check (CRC) code. According to the pilot code, the transmission of the displacement data packet is synchronous with the wireless signal. According to the device ID code, the signal receiving terminal could recognize whether the packet is transmitted from a corresponding signal output terminal. The flag indicates a current state of wireless transmission. According to the CRC code, the damaged or erroneous data resulted from external noise during wireless transmission are discriminated and thus the signal output terminal reissues a signal. The payload data includes a data type code and the mouse displacement data.

FIG. 2A is a schematic timing waveform diagram illustrating related displacement data packets transmitted from the wireless signal emitter of the conventional wireless mouse to the wireless signal receiver. As shown in FIG. 2A, four successive sets of displacement data packets are generated in response to triggering operations by the user. These displacement data packets include a first displacement data packet 11, a second displacement data packet 12, a third displacement data packet 13 and a fourth displacement data packet 14. The data formats of these displacement data packets are substantially identical except for the contents of the mouse displacement data. For clarification and brevity, only the data format of the first displacement data packet 11 will be illustrated as follows. The first displacement data packet 11 includes a first pilot code 111, a first device ID code 112, a first flag 113, a first payload data 114 and a first CRC code 115. The first payload data 114 includes a first data type code DI11 and first mouse displacement data 1141. The first mouse displacement data 1141 includes a first key clicking data Key11, a first horizontal mouse displacement data X11, a first vertical mouse displacement data Y11, a first scroll wheel rotating data Z11 and a first window horizontal scrolling data H11.

FIG. 2B is a schematic timing waveform diagram illustrating related mouse displacement data transmitted from the wireless signal receiver to the computer system. Hereinafter, a data transmission method according to the prior art will be illustrated with reference to FIG. 1, FIG. 2A and FIG. 2B.

In response to a triggering operation of the wireless mouse 100, the wireless mouse 100 will generate a corresponding first mouse displacement data 1141. Under control of the control unit 102, the first mouse displacement data 1141 is converted into a first displacement data packet 11. Next, a wireless signal WS containing the first displacement data packet 11 will be transmitted from the wireless signal emitter 101 to the wireless signal receiver 103. After receiving the wireless signal WS, the wireless signal receiver 103 restores the first displacement data packet 11 to the first mouse displacement data 1141 and then transmits the first mouse displacement data 1141 to the computer system 104. As shown in FIG. 2A, a set of displacement data packet is generated in every wireless transmission time interval T. The wireless transmission time interval T is for example 8 milliseconds. That is, a wireless transmission is done per 8 milliseconds. Since the wired transmission time interval T' as shown in FIG.

2B is also 8 milliseconds, the transmitting side (i.e. the wireless signal emitter side) performs a wireless transmission per 8 milliseconds and the receiving side transmits a set of mouse displacement data to the computer system 104 per 8 milliseconds.

Like the first displacement data packet 11, the second displacement data packet 12, the third displacement data packet 13 and the fourth displacement data packet 14 as shown in FIG. 2A are converted into a second displacement data packet 1241, a third displacement data packet 1341 and a fourth displacement data packet 1441, respectively. After receiving the wireless signal WS, the wireless signal receiver 103 transmits these mouse displacement data 1241, 1341 and 1441 to the computer system 104. By reading these mouse displacement data, the computer system 104 will execute functions corresponding to the triggering operations of the wireless mouse 100.

In a case that the wireless transmission time interval T is 8 milliseconds, the wireless report rate is 125 reports per second. Whereas, in a case that the wired transmission time interval T' is 8 milliseconds, the wired report rate is also 125 reports per second. That is, the computer system 103 periodically issues a request for receiving the mouse displacement data from the wireless signal receiver 103 in every 8 milliseconds. For achieving optimal transmission efficiency of the wireless mouse, the wireless transmission time interval is usually set to be equal to the wired transmission time interval.

With rapid development of electronic and information industries, the demand on the report rate is gradually increased. For example, the wired report rate of the wireless mouse needs to be increased to be 500 reports per second. That is, the wired transmission time interval of the wireless mouse is set to be 2 milliseconds. Since the wireless transmission time interval of the wireless mouse is equal to the wired transmission time interval, the wireless transmission time interval is also 2 milliseconds. Since the wired report rate of the wireless mouse is increased from 125 reports per second to 500 reports per second, the consumed electricity is increased by four times. Due to the increased power consumption, the battery of the wireless mouse needs to be frequently replaced because the use time of the battery is insufficient. For obviating the problems encountered in the prior art, there is a need of providing a data transmission method of a wireless mouse for increasing the wired report rate without largely increasing power consumption.

SUMMARY OF THE INVENTION

It is an object of the present invention provides a data transmission method of a wireless mouse for increasing the wired report rate without largely increasing power consumption.

In accordance with an aspect of the present invention, there is provided a data transmission method for use with a wireless mouse. The wireless mouse includes a wireless signal emitter and a wireless signal receiver. The wireless signal receiver is in communication with a computer system. The wireless mouse generates a mouse displacement data in response to a triggering operation by a user. The data transmission method includes the following steps. Firstly, the mouse displacement data is periodically transmitted from the wireless signal emitter to the wireless signal receiver in every wireless transmission time interval T1, wherein the mouse displacement data includes a horizontal displacement and a vertical displacement. Then, the horizontal displacement and the vertical displacement of the mouse displacement data are partitioned to acquire plural horizontal sub-displacements and plural vertical sub-displacements, respectively. Afterwards, one of the plural horizontal sub-displacements and one of the plural vertical sub-displacements are periodically transmitted from the wireless signal receiver to the computer system in every wired transmission time interval T2, wherein the wireless transmission time interval T1 is longer than the wired transmission time interval T2.

In an embodiment, the step of acquiring the plural horizontal sub-displacements and the plural vertical sub-displacements includes sub-steps of determining a partition value according to the horizontal displacement and the vertical displacement; dividing the horizontal displacement by the partition value to obtain a horizontal quotient, a horizontal remainder and plural horizontal reserve sub-displacements, and dividing the vertical displacement by the partition value to obtain a vertical quotient, a vertical remainder and plural vertical reserve sub-displacements; and assigning the horizontal remainder to the plural horizontal reserve sub-displacements to obtain the plural horizontal sub-displacements, and assigning the vertical remainder to the plural vertical reserve sub-displacements to obtain the plural vertical sub-displacements.

In an embodiment, if the horizontal displacement or the vertical displacement is equal to zero and the absolute value of the non-zero horizontal displacement or the absolute value of the non-zero vertical displacement is greater than or equal to a preset value, the partition value is equal to the preset value.

In an embodiment, if the horizontal displacement or the vertical displacement is equal to zero and the absolute value of the non-zero horizontal displacement or the absolute value of the non-zero vertical displacement is smaller than a preset value, the partition value is equal to the non-zero horizontal displacement or the non-zero vertical displacement.

In an embodiment, if the absolute value of the horizontal displacement and the absolute value of the vertical displacement are both greater than or equal to a preset value or the absolute value of the horizontal displacement and the absolute value of the vertical displacement are both smaller than the preset value, the partition value is equal to the preset value.

In an embodiment, if the absolute value of the horizontal displacement is greater than or equal to a preset value and the absolute value of the vertical displacement is smaller than the preset value, the partition value is equal to the vertical displacement.

In an embodiment, if the absolute value of the vertical displacement is greater than or equal to a preset value and the absolute value of the horizontal displacement is smaller than the preset value, the partition value is equal to the horizontal displacement.

In an embodiment, the wireless mouse further generates a second displacement data including a second horizontal displacement and a second vertical displacement. The step of acquiring the plural horizontal sub-displacements and the plural vertical sub-displacements includes sub-steps of combining the horizontal displacement and the second horizontal displacement as a combination horizontal displacement, combining the vertical displacement and the second vertical displacement as a combination vertical displacement, and determining a partition value according to the combination horizontal displacement and the combination vertical displacement; dividing the combination horizontal displacement by the partition value to obtain a horizontal quotient, a horizontal remainder and plural horizontal reserve sub-displacements, and dividing the combination vertical displacement by the partition value to obtain a vertical quotient, a vertical remainder and plural vertical reserve sub-displacements; and assigning the horizontal remainder to the plural horizontal reserve sub-displacements to obtain the plural horizontal sub-displacements, and assigning the vertical remainder to the plural vertical reserve sub-displacements to obtain the plural vertical sub-displacements.

In an embodiment, if the absolute values of the horizontal displacement and the second horizontal displacement are both greater than or equal to a preset value and the absolute values of the vertical displacement and the second vertical displacement are both ranged between zero and the preset value, the partition value is equal to the combination vertical displacement.

In an embodiment, if the absolute values of the vertical displacement and the second vertical displacement are both greater than or equal to a preset value and the absolute values of the horizontal displacement and the second horizontal displacement are both ranged between zero and the preset value, the partition value is equal to the combination horizontal displacement.

In an embodiment, if the horizontal displacement and the second vertical displacement are both equal to zero and the second horizontal displacement and the vertical displacement are not equal to zero, the data transmission method further includes a step of discriminating whether the absolute value of the second horizontal displacement and the absolute value of the vertical displacement are both greater than the preset value.

In an embodiment, if the absolute value of the second horizontal displacement and the absolute value of the vertical displacement are both greater than the preset value, the partition value is equal to the preset value.

In an embodiment, if the absolute value of the second horizontal displacement is greater than or equal to the preset value and the absolute value of the vertical displacement is smaller than the preset value, or if the absolute value of the second horizontal displacement and the absolute value of the vertical displacement are both smaller than the preset value and the absolute value of the second horizontal displacement is greater than the absolute value of the vertical displacement, the partition value is equal to the vertical displacement.

In an embodiment, if the absolute value of the vertical displacement is greater than or equal to the preset value and the absolute value of the second horizontal displacement is smaller than the preset value, or if the absolute value of the second horizontal displacement and the absolute value of the vertical displacement are both smaller than the preset value and the absolute value of the vertical displacement is greater than the absolute value of the second horizontal displacement, the partition value is equal to the second horizontal displacement.

In an embodiment, if the vertical displacement and the second horizontal displacement are both equal to zero and the second vertical displacement and the horizontal displacement are not equal to zero, the data transmission method further includes a step of discriminating whether the absolute value of the second vertical displacement and the absolute value of the horizontal displacement are both greater than the preset value.

In an embodiment, if the absolute value of the second vertical displacement and the absolute value of the horizontal displacement are both greater than the preset value, the partition value is equal to the preset value.

In an embodiment, if the absolute value of the second vertical displacement is greater than or equal to the preset value and the absolute value of the horizontal displacement is smaller than the preset value, or if the absolute value of the second vertical displacement and the absolute value of the horizontal displacement are both smaller than the preset value and the absolute value of the second vertical displacement is greater than the absolute value of the horizontal displacement, the partition value is equal to the horizontal displacement.

In an embodiment, if the absolute value of the horizontal displacement is greater than or equal to the preset value and the absolute value of the second vertical displacement is smaller than the preset value, or if the absolute value of the second vertical displacement and the absolute value of the horizontal displacement are both smaller than the preset value and the absolute value of the horizontal displacement is greater than the absolute value of the second vertical displacement, the partition value is equal to the second vertical displacement.

In an embodiment, the horizontal remainder is assigned according to the horizontal displacement and the second horizontal displacement, and the vertical remainder is assigned according to the vertical displacement and the second vertical displacement.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 6 is a schematic functional block diagram illustrating a data transmission system for implementing the data transmission method according to the second embodiment of the present invention.

DETAILED DESCRIPTION OF THE PREFERRED EMBODIMENT

Figure 1:
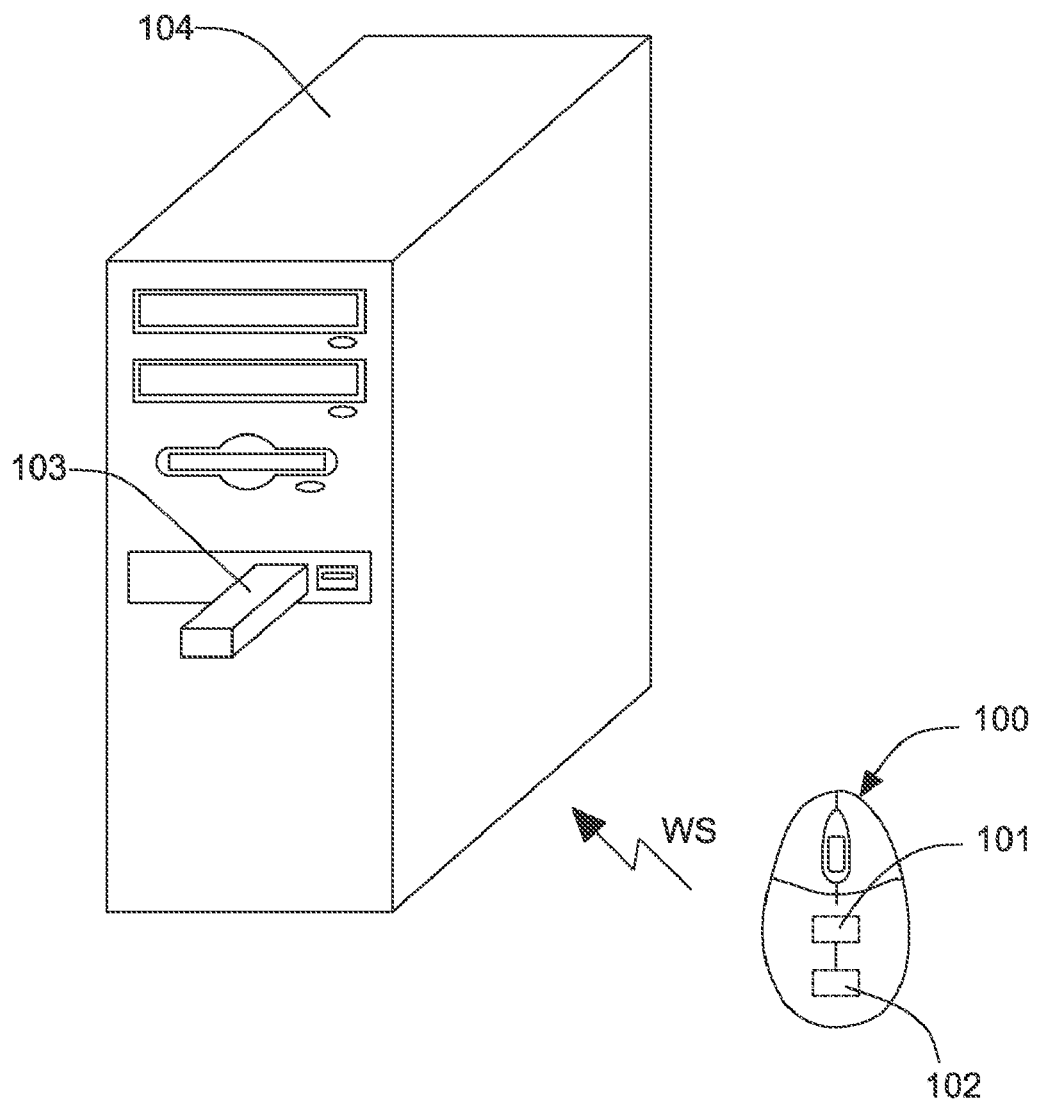
FIG. 1 is a schematic diagram illustrating wireless communication of a conventional wireless mouse.
Figure 2A:
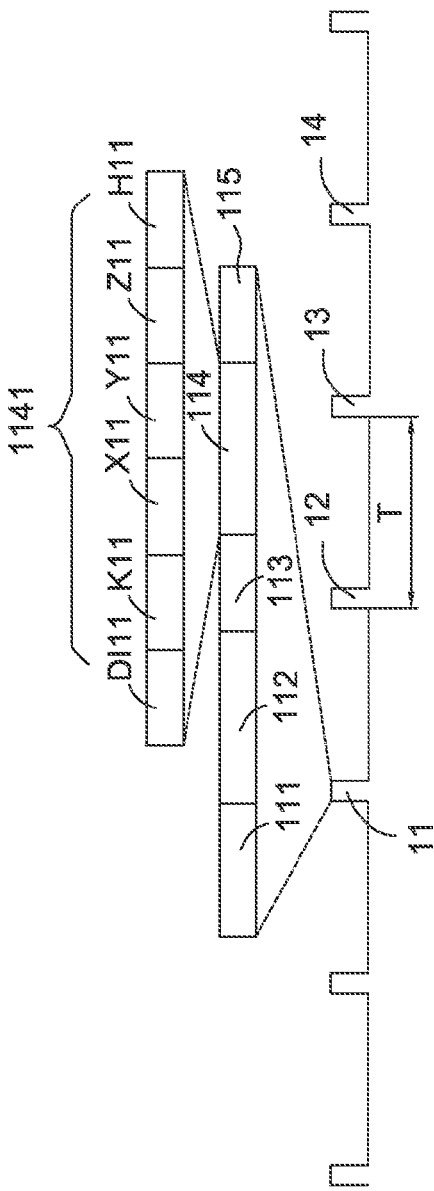
FIG. 2A is a schematic timing waveform diagram illustrating related displacement data packets transmitted from the wireless signal emitter of the conventional wireless mouse to the wireless signal receiver.
Figure 2B:
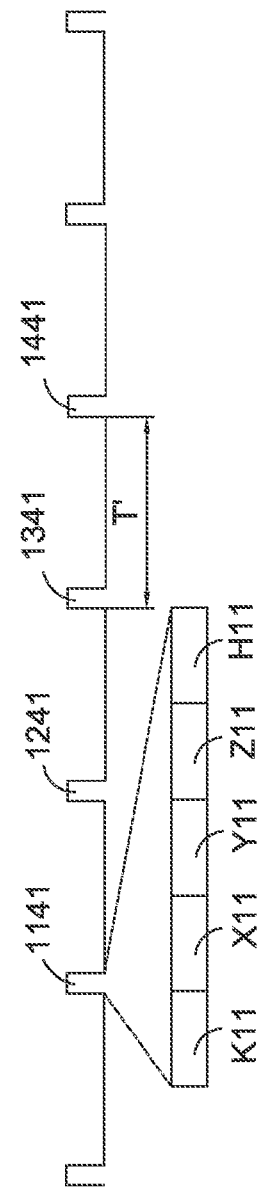
FIG. 2B is a schematic timing waveform diagram illustrating related mouse displacement data transmitted from the wireless signal receiver to the computer system.
Figure 3:
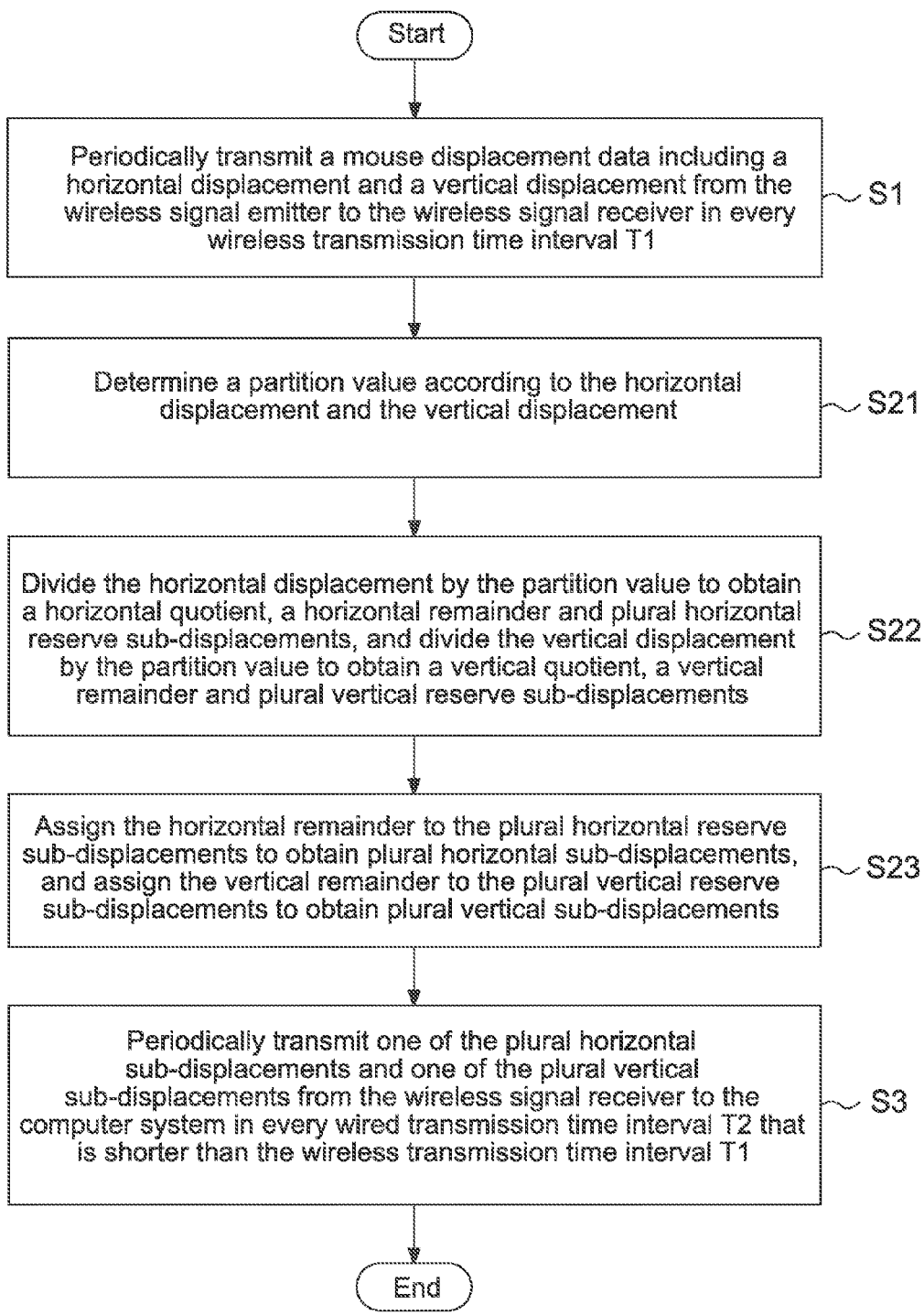
FIG. 3 is a flowchart illustrating a data transmission method for use with a wireless mouse according to a first embodiment of the present invention.

FIG. 3 is a flowchart illustrating a data transmission method for use with a wireless mouse according to a first embodiment of the present invention. First of all, a mouse displacement data including a horizontal displacement and a vertical displacement is periodically transmitted from a wireless signal emitter to a wireless signal receiver in every wireless transmission time interval T1 (Step S1). Next, the horizontal displacement and the vertical displacement of the mouse displacement data are respectively partitioned into plural horizontal sub-displacements and plural vertical sub-displacements (Step S2, not shown in the drawing). Next, one of the plural horizontal sub-displacements and one of the plural vertical sub-displacements are periodically transmitted from the wireless signal receiver to a computer system in every wired transmission time interval T2, wherein the wired transmission time interval T2 is shorter than the wireless transmission time interval T1 (Step S3).

The Step S2 further comprises the following sub-steps. In the Sub-step S21, a partition value is determined according to the horizontal displacement and the vertical displacement. Next, the horizontal displacement is divided by the partition value to obtain a horizontal quotient, a horizontal remainder and plural horizontal reserve sub-displacements, and the vertical displacement is divided by the partition value to obtain a vertical quotient, a vertical remainder and plural vertical reserve sub-displacements (Sub-step S22). Next, the horizontal remainder is assigned to the plural horizontal reserve sub-displacements to obtain the plural horizontal sub-displacements, and the vertical remainder is assigned to the plural vertical reserve sub-displacements to obtain the plural vertical sub-displacements (Sub-step S23). In this embodiment, a preset value equal to 4 is defined.

Figure 4:
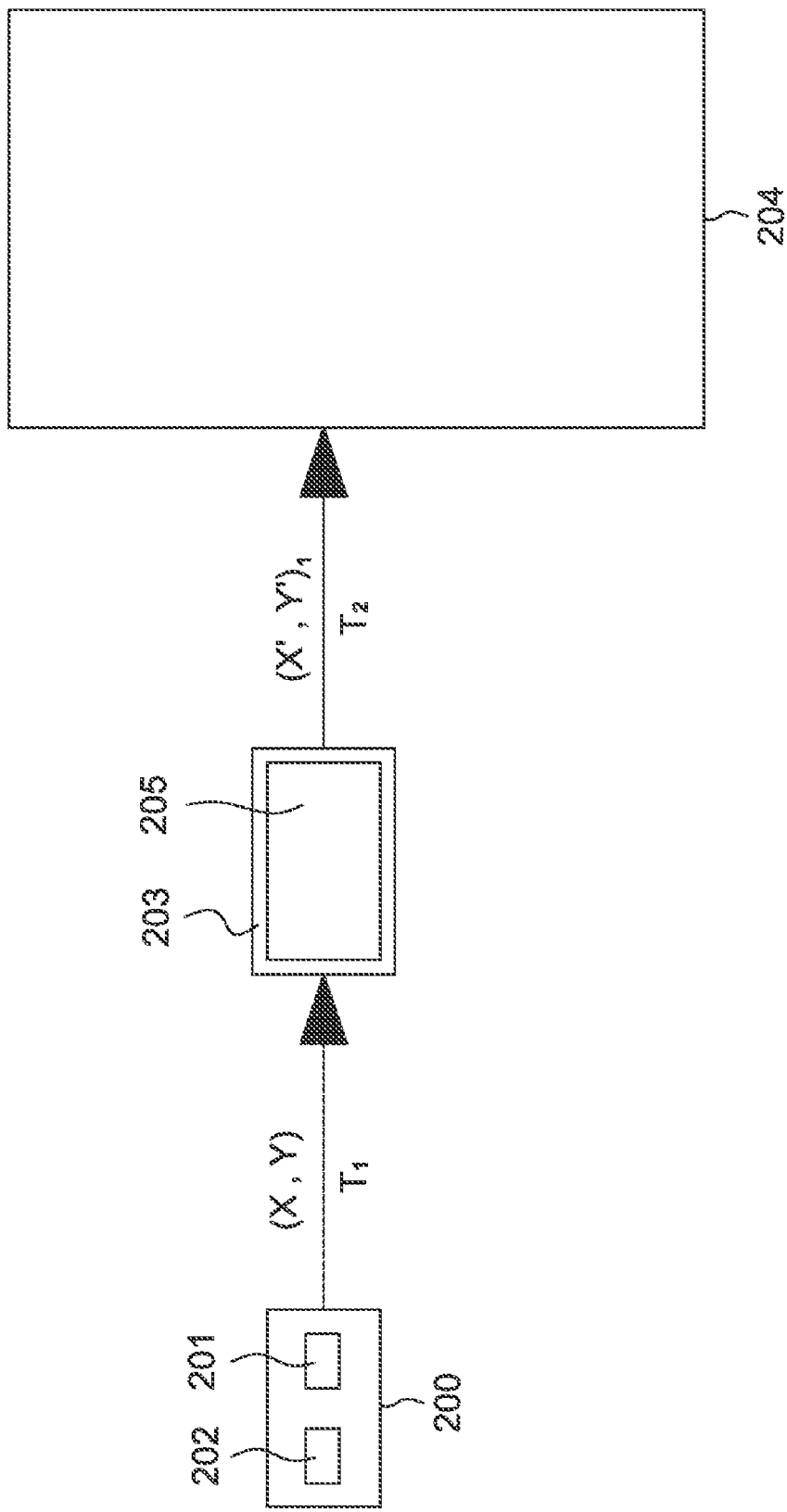
FIG. 4 is a schematic functional block diagram illustrating a data transmission system for implementing the data transmission method according to the first embodiment of the present invention.

FIG. 4 is a schematic functional block diagram illustrating a data transmission system for implementing the data transmission method according to the first embodiment of the present invention. As shown in FIG. 4, the data transmission system comprises a wireless mouse 200, a wireless signal receiver 203 and a computer system 204. The wireless mouse 200 comprises a first control unit 201 and a wireless signal emitter 202. The wireless signal receiver 203 is in communication with the computer system 204 via a universal serial bus (USB). The wireless signal receiver 203 has a second control unit 205. When the wireless mouse 200 is operated by the user, a mouse displacement data packet is transmitted from the wireless signal emitter 202 to the wireless signal receiver 203. The mouse displacement data packet comprises a pilot code, a device ID code, a flag, a payload data and a CRC code. For clarification and brevity, only the mouse displacement data of the payload data will be illustrated as follows. The other data are identical to those described in the art, and are not redundantly described herein.

Hereinafter, the data transmission method of the present invention will be illustrated in more details with reference to FIGS. 3 and 4. In response to a triggering operation of the wireless mouse 200 by a user, a mouse displacement data (X,Y) is transmitted from the wireless signal emitter 202 to the wireless signal receiver 203 (Step S1). The mouse displacement data (X,Y) includes a horizontal displacement X and a vertical displacement Y. In a case that the wireless mouse 200 is continuously operated by the user, a set of mouse displacement data is periodically transmitted from the wireless signal emitter 202 to the wireless signal receiver 203 in every wireless transmission time interval T1. In this embodiment, the wireless transmission time interval T1 is 8 milliseconds. Under control of the first control unit 201, a mouse displacement data (X,Y) is transmitted from the wireless signal emitter 202 in every wireless transmission time interval T1.

When the mouse displacement data (X,Y) is transmitted to the wireless signal receiver 203 according to a wireless transmission technology, the horizontal displacement X and the vertical displacement Y of the mouse displacement data (X,Y) are respectively portioned into plural horizontal sub-displacements X1', X2', X3', X4' and plural vertical sub-displacements Y1', Y2', Y3', Y4' (Step S2).

The procedure of respectively portioning the horizontal displacement X and the vertical displacement Y into the plural horizontal sub-displacements X1', X2', X3', X4' and the plural vertical sub-displacements Y1', Y2', Y3', Y4' will be performed by the Sub-steps S21, S22 and S23. In the Sub-step S21, a partition value is determined according to the horizontal displacement X and the vertical displacement Y. There are four situations for determining the partition value according to the horizontal displacement X and the vertical displacement Y, which will be illustrated later. In the Sub-step S22, the horizontal displacement X is divided by the partition value to obtain a horizontal quotient XQ, a horizontal remainder XR and plural horizontal reserve sub-displacements X*, wherein each of the plural horizontal reserve sub-displacements X* is equal to the horizontal quotient XQ; and the vertical displacement Y is divided by the partition value to obtain a vertical quotient YQ, a vertical remainder YR and plural vertical reserve sub-displacements Y*, wherein each of the plural vertical reserve sub-displacements Y* is equal to the vertical quotient YQ. In the Sub-step S23, the horizontal remainder XR is assigned to the plural horizontal reserve sub-displacements X* to obtain plural horizontal sub-displacements X', and the vertical remainder YR is assigned to the plural vertical reserve sub-displacements Y* to obtain plural vertical sub-displacements Y'.

Hereinafter, the procedures from the step of determining the partition value to the step of obtaining the plural horizontal sub-displacements X' and the plural vertical sub-displacements Y' will be illustrated according to four situations.

In a first situation that the horizontal displacement X or the vertical displacement Y is equal to zero and the absolute value of the non-zero horizontal displacement X or the absolute value of the non-zero vertical displacement Y is greater than or equal to the preset value, the partition value is equal to the preset value. For example, assuming that the preset value is 4 and the mouse displacement data (X,Y) is (7,0), the partition value is 4 because the vertical displacement Y is equal to zero and the absolute value of the non-zero horizontal displacement X (=7) is greater than 4. Next, the horizontal displacement X (=7) is divided by the partition value (=4) to obtain a horizontal quotient XQ (=1), a horizontal remainder XR (=3) and four horizontal reserve sub-displacements X*. In addition, each of the four horizontal reserve sub-displacements X* is equal to the horizontal quotient XQ (=1). That is, each of the four horizontal reserve sub-displacements X* is equal to 1. Furthermore, each of the four reserve sub-displacements Y* is equal to 0. Under this circumstance, the four sets of reserve sub-displacement data (X*,Y*) corresponding to the four horizontal reserve sub-displacements X* and the four reserve sub-displacements Y* are (1,0), (1,0), (1,0) and (1,0), respectively.

Next, the horizontal remainder XR (=3) is assigned to three of the four reserve sub-displacements X*. The strategy of assigning the horizontal remainder XR is determined according to the horizontal displacement difference between the previous mouse displacement data and the current mouse displacement data (X,Y). If the horizontal displacement difference is negative, the displacement of the wireless mouse 200 in the horizontal direction is gradually decreased, so that the horizontal remainder XR is assigned to the first XR sets of reserve sub-displacements X*. On the other hand, if the horizontal displacement difference is positive, the horizontal remainder XR is assigned to the last XR sets of reserve sub-displacements X*. In views of the vertical remainder YR, the rest may be deduced by analogy. Assuming that the horizontal displacement difference and the vertical displacement difference are negative, the four horizontal sub-displacements X' after the assignment are respectively 2, 2, 2 and 1. Correspondingly, four sub-displacement data $(X',Y')_1$, $(X',Y')_2$, $(X',Y')_3$ and $(X',Y')_4$ are respectively (2,0), (2,0), (2,0) and (1,0).

In a second situation that the horizontal displacement X or the vertical displacement Y is equal to zero and the absolute value of the non-zero horizontal displacement X or the absolute value of the non-zero vertical displacement Y is smaller than the preset value, the partition value is equal to the non-zero horizontal displacement X or the non-zero vertical displacement Y. For example, assuming that the mouse displacement data (X,Y) is (0,3), the partition value is 3 because the horizontal displacement X is equal to zero and the absolute value of the non-zero vertical displacement Y (=3) is smaller than the preset value (=4). Next, the vertical displacement Y (=3) is divided by the partition value (=3) to obtain a vertical quotient YQ (=1) and a vertical remainder YR (=0). Since the vertical remainder YR is 0, three sets of reserve sub-displacement data (X*,Y*) are (0,1), (0,1) and (0,1). The three sub-displacement data $(X',Y')_1$, $(X',Y')_2$, and $(X',Y')_3$ are identical to the reserve sub-displacement data (X*,Y*), i.e. (0,1), (0,1) and (0,1). Similar results are obtained if the vertical displacement Y is equal to zero and the absolute value of the non-zero horizontal displacement X is smaller than the preset value (i.e. the second situation).

In a third situation that the absolute value of the horizontal displacement X and the absolute value of the vertical displacement Y are both greater than or equal to the preset value or the absolute value of the horizontal displacement X and the absolute value of the vertical displacement Y are both smaller than the preset value, the partition value is equal to the preset value. For example, assuming that the mouse displacement data (X,Y) is (−10,−5), the partition value is 4 because the absolute value of the horizontal displacement X (=10) and the absolute value of the vertical displacement Y (=5) are both greater than the preset value (=4). After the Sub-steps S22 and S23 are done, the obtained sub-displacement data $(X',Y')_1$, $(X',Y')_2$, $(X',Y')_3$ and $(X',Y')_4$ are respectively (−3,−2), (−3,−2), (−2,−1) and (−2,−1). Similar results are obtained if the absolute value of the horizontal displacement X and the absolute value of the vertical displacement Y are both smaller than the preset value.

In a fourth situation that the absolute value of the horizontal displacement X is greater than or equal to the preset value and the absolute value of the vertical displacement Y is smaller than the preset value, the partition value is equal to the vertical displacement Y. Alternatively, if the absolute value of the vertical displacement Y is greater than or equal to the preset value and the absolute value of the horizontal displacement X is smaller than the preset value, the partition value is equal to the horizontal displacement X. For example, assuming that the mouse displacement data (X,Y) is (11,3), the partition value is 3 because the absolute value of the horizontal displacement X (=11) is greater than the preset value (=4) and the absolute value of the vertical displacement Y (=3) is smaller than the preset value (=4). After the Sub-steps S22 and S23 are done, the obtained sub-displacement data $(X',Y')_1$, $(X',Y')_2$, and $(X',Y')_3$ are respectively (4,1), (4,1) and (3,1).

After the plural sub-displacement data are obtained, one of the plural sub-displacement data is periodically transmitted from the wireless signal receiver 203 to the computer system 204 in every wired transmission time interval T2. For example, the wired transmission time interval T2 is 2 milliseconds. Under control of the second control unit 205, one of the plural sub-displacement data is periodically transmitted from the wireless signal receiver 203 to the computer system 204 in every wired transmission time interval T2. In accordance with a key feature of data transmission method of the present invention, the wireless transmission time interval T1 may be independent of the wired transmission time interval T2. For example, the wireless transmission time interval T1 is still 8 milliseconds, so that the power consumption during the wireless transmission is not increased. Since the wired transmission time interval T2 is 2 milliseconds, the wired report rate will be increased to 500 reports per second.

Figure 5:
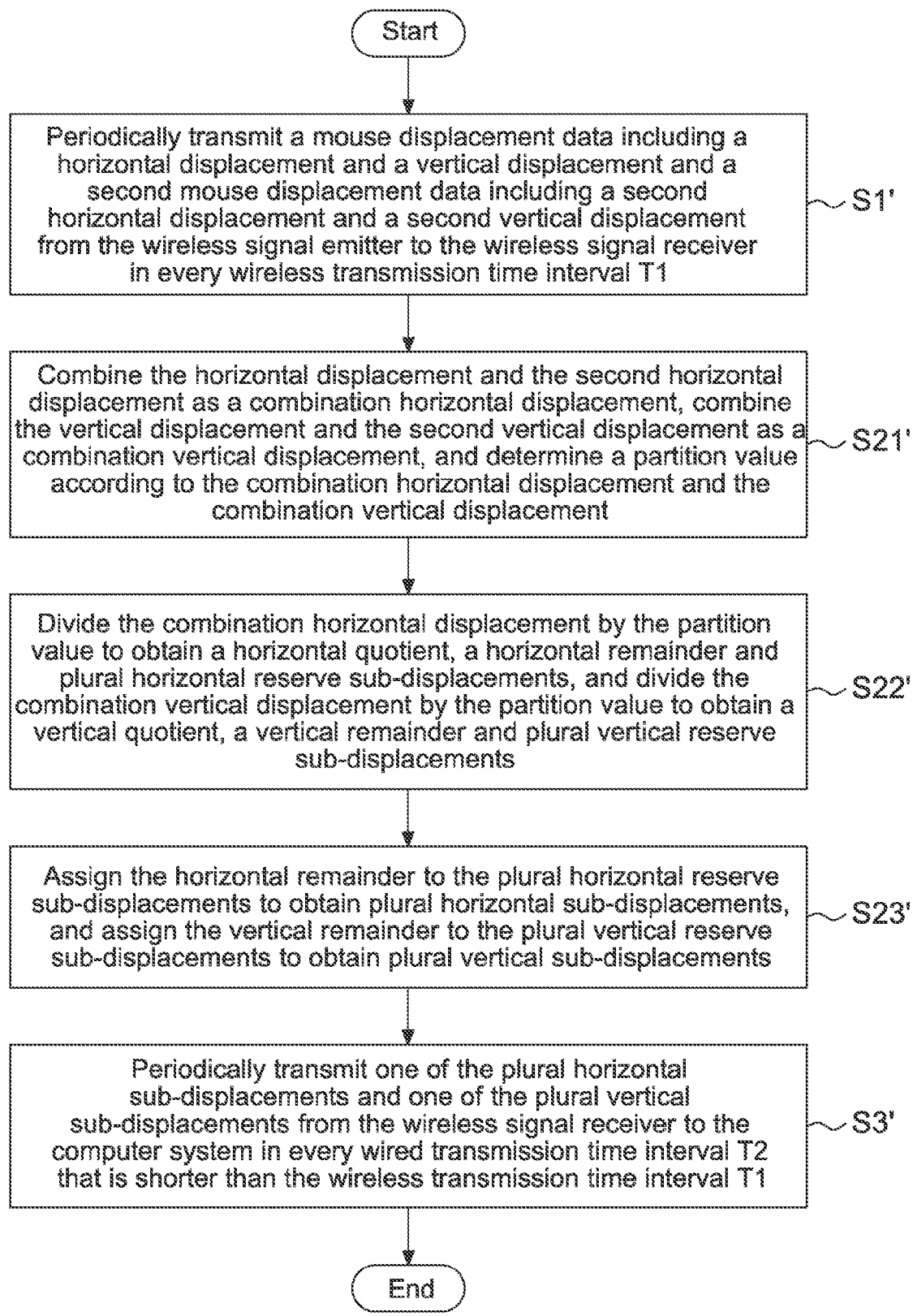
FIG. 5 is a flowchart illustrating a data transmission method for use with a wireless mouse according to a second embodiment of the present invention.

FIG. 5 is a flowchart illustrating a data transmission method for use with a wireless mouse according to a second embodiment of the present invention. First of all, a mouse displacement data and a second mouse displacement data are periodically transmitted from a wireless signal emitter to a wireless signal receiver in every wireless transmission time interval T1, wherein the mouse displacement data includes a horizontal displacement and a vertical displacement, and the second displacement data includes a second horizontal displacement and a second vertical displacement (Step S1').

The Step S2' further comprises the following sub-steps. In the Sub-step S21', the horizontal displacement and the second horizontal displacement are combined as a combination horizontal displacement, the vertical displacement and the second vertical displacement are combined as a combination vertical displacement, and a partition value is determined according to the combination horizontal displacement and the combination vertical displacement. Next, the combination horizontal displacement is divided by the partition value to obtain a horizontal quotient, a horizontal remainder and plural horizontal reserve sub-displacements, and the combination vertical displacement is divided by the partition value to obtain a vertical quotient, a vertical remainder and plural vertical reserve sub-displacements (Sub-step S22'). Next, the horizontal remainder is assigned to the plural horizontal reserve sub-displacements to obtain the plural horizontal sub-displacements, and the vertical remainder is assigned to the plural vertical reserve sub-displacements to obtain the plural vertical sub-displacements (Sub-step S23'). In this embodiment, a preset value equal to 4 is defined.

After the Step S2' is done, one of the plural horizontal sub-displacements and one of the plural vertical sub-displacements are periodically transmitted from the wireless signal receiver to a computer system in every wired transmission time interval T2, wherein the wired transmission time interval T2 is shorter than the wireless transmission time interval T1 (Step S3').

FIG. 6 is a schematic functional block diagram illustrating a data transmission system for implementing the data transmission method according to the second embodiment of the present invention. As shown in FIG. 6, the data transmission system comprises a wireless mouse 200, a wireless signal receiver 203 and a computer system 204. The wireless mouse 200 comprises a first control unit 201 and a wireless signal emitter 202. The wireless signal receiver 203 is in communication with the computer system 204. The wireless signal receiver 203 has a second control unit 205. The hardware components of the data transmission system of FIG. 6 are similar to those of the first embodiment, and are not redundantly described herein.

Hereinafter, the data transmission method of the present invention will be illustrated in more details with reference to FIGS. 5 and 6. In response to a triggering operation of the wireless mouse 200 by a user, a mouse displacement data (X1,Y1) and a second mouse displacement data (X2,Y2) are transmitted from the wireless signal emitter 202 to the wireless signal receiver 203 (Step S1'). The mouse displacement data (X1,Y1) includes a horizontal displacement X1 and a vertical displacement Y1. The second mouse displacement data (X2,Y2) includes a second horizontal displacement X2 and a second vertical displacement Y2. After the mouse displacement data (X1,Y1) is transmitted from the wireless signal emitter 202 to the wireless signal receiver 203 for the wireless transmission time interval T1, the second mouse displacement data (X2,Y2) is transmitted from the wireless signal emitter 202 to the wireless signal receiver 203. In this embodiment, the wireless transmission time interval T1 is 8 milliseconds.

When the mouse displacement data (X1,Y1) and the second mouse displacement data (X2,Y2) are transmitted to the wireless signal receiver 203 according to a wireless transmission technology, the horizontal displacement X1 and the second horizontal displacement X2 are combined as a combination horizontal displacement X1+X2, and the vertical displacement Y1 and the second vertical displacement Y2 are combined as a combination vertical displacement Y1+Y2. According to the combination horizontal displacement X1+X2 and the combination vertical displacement Y1+Y2, a partition value is determined (Step S21'). Next, the combination horizontal displacement X1+X2 is divided by the partition value to obtain a horizontal quotient XQ, a horizontal remainder XR and plural horizontal reserve sub-displacements X1+X2*, and the combination vertical displacement Y1+Y2 is divided by the partition value to obtain a vertical quotient YQ, a vertical remainder YR and plural vertical reserve sub-displacements Y1+Y2* (Sub-step S22'). Next, the horizontal remainder XR is assigned to the plural horizontal reserve sub-displacements X1+X2* to obtain the plural horizontal sub-displacements X1+X2', and the vertical remainder YR is assigned to the plural vertical reserve sub-displacements Y1+Y2* to obtain the plural vertical sub-displacements Y1+Y2' (Sub-step S23').

Hereinafter, the step of determining the partition value to the step of obtaining the plural horizontal sub-displacements X1+X2' and the plural vertical sub-displacements Y1+Y2' will be illustrated according to three situations.

In a first situation that the absolute values of the horizontal displacement X1 and the second horizontal displacement X2 are both greater than or equal to the preset value and the absolute values of the vertical displacement Y1 and the second vertical displacement Y2 are both ranged between zero and the preset value, the partition value is equal to the combination vertical displacement Y1+Y2. Alternatively, if the absolute values of the vertical displacement Y1 and the second vertical displacement Y2 are both greater than or equal to the preset value and the absolute values of the horizontal displacement X1 and the second horizontal displacement X2 are both ranged between zero and the preset value, the partition value is equal to the combination horizontal displacement X1+X2. For example, assuming that the preset value is 4, the mouse displacement data (X1,Y1) is (8,3) and the second mouse displacement data (X2,Y2) is (5,2), the partition value is equal to the combination vertical displacement Y1+Y2 (=5) because the absolute values of the horizontal displacement X1 (=8) and the second horizontal displacement X2 (=5) are both greater than or equal to the preset value (=4) and the absolute values of the vertical displacement Y1 (=3) and the second vertical displacement Y2 (=2) are both ranged between zero and the preset value (=4).

Next, the combination horizontal displacement X1+X2 (=13) is divided by the partition value (=5) to obtain a horizontal quotient XQ (=2), a horizontal remainder XR (=3) and five horizontal reserve sub-displacements X1+X2*. In addition, each of the five horizontal reserve sub-displacements X1+X2* is equal to the horizontal quotient XQ (=2). That is, each of the five horizontal reserve sub-displacements X1+X2* is equal to 2. In such way, five vertical reserve sub-displacements Y1+Y2* are obtained. Each of the five vertical reserve sub-displacements Y1+Y2* is equal to 1, and the vertical quotient YQ is equal to 0. Under this circumstance, the five set reserve sub-displacement data (X1+X2*, Y1+Y2*) corresponding to the five horizontal reserve sub-displacements X1+X2* and the five vertical reserve sub-displacements Y1+Y2* are (2,1), (2,1), (2,1), (2,1) and (2,1), respectively.

Next, the horizontal remainder XR (=3) is assigned to three of the five reserve sub-displacements X1+X2*. In the Step S23', the strategy of assigning the horizontal remainder XR is determined according to the horizontal displacement X1 and the second horizontal displacement X2. Similarly, the strategy of assigning the vertical quotient YQ is determined according to the vertical displacement Y1 and the second vertical displacement Y2. Since the horizontal displacement X1 is 8 and the second horizontal displacement X2 is 5, the displacement of the wireless mouse 200 in the horizontal direction is gradually decreased, so that the horizontal remainder XR is assigned to the first XR sets of reserve sub-displacements X1+X2*. On the other hand, if displacement of the wireless mouse 200 in the horizontal direction is gradually increased, the horizontal remainder XR is assigned to the last XR sets of reserve sub-displacements X*. After the assignment, the five reserve sub-displacements X1+X2* are respectively 3, 3, 3, 2 and 2. Correspondingly, five sub-displacement data $(X1+X2*, Y1+Y2*)_1$, $(X1+X2*, Y1+Y2*)_2$, $(X1+X2*, Y1+Y2*)_3$, $(X1+X2*, Y1+Y2*)_4$ and $(X1+X2*, Y1+Y2*)_5$ are respectively (3,1), (3,1), (3,1), (2,1) and (2,1).

If the horizontal displacement X1 and the second vertical displacement Y2 are both equal to zero and the second horizontal displacement X2 and the vertical displacement Y1 are not equal to zero, the data transmission method further comprises a step of discriminating whether the absolute value of the second horizontal displacement X2 and the absolute value of the vertical displacement Y1 are both greater than the preset value. Meanwhile, a second situation and a third situation are further defined. In the second situation that the absolute value of the second horizontal displacement X2 and the absolute value of the displacement Y1 are both greater than the preset value, the partition value is equal to the preset value. In the third situation that the absolute value of the second horizontal displacement X2 and the absolute value of the vertical displacement Y1 are both smaller than the preset value, or one of absolute value of the second horizontal displacement X2 and the absolute value of the vertical displacement Y1 is smaller than the preset value, the partition value is equal to the minimum of the absolute value of the second horizontal displacement X2 and the absolute value of the vertical displacement Y1.

For example, in a second situation, assuming that the mouse displacement data (X1,Y1) is (0,5) and the second mouse displacement data (X2,Y2) is (8,0), the partition value is equal to the preset value (=4) because the horizontal displacement X1 and the second vertical displacement Y2 are both equal to zero and the absolute value of the non-zero second horizontal displacement X2 (=5) and the absolute value of the non-zero vertical displacement Y1 (=8) are both greater than the preset value. After the Step S22' is done, four reserve sub-displacements (X1+X2*, Y1+Y2*), i.e. (2,1), (2,1), (2,1) and (2,1), are obtained. After the Step S23' is done, four sub-displacement data $(X1+X2', Y1+Y2')_1$, $(X1+X2', Y1+Y2')_2$, $(X1+X2', Y1+Y2')_3$ and $(X1+X2', Y1+Y2')_4$, are respectively (3,1), (2,1), (2,1) and (2,1). Similar results are obtained if the vertical displacement Y1 and the second horizontal displacement X2 are both equal to zero and the absolute value of the non-zero second vertical displacement Y2 and the absolute value of the non-zero horizontal displacement X1 are both greater than the preset value.

For example, in a third situation, assuming that the mouse displacement data (X1,Y1) is (0,3) and the second mouse displacement data (X2,Y2) is (2,0), the partition value is equal to the second horizontal displacement X2 (=2) because the horizontal displacement X1 and the second vertical displacement Y2 are both equal to zero and the absolute value of the non-zero second horizontal displacement X2 (=2) and the absolute value of the non-zero vertical displacement Y1 (=3) are both smaller than the preset value (=4). After the Step S22' is done, two reserve sub-displacements (X1+X2*, Y1+Y2*), i.e. (1,1) and (1,1), are obtained. After the Step S23' is done, two sub-displacement data (X1+X2',Y1+Y2')$_1$ and (X1+X2', Y1+Y2')$_2$ are respectively (1,1) and (1,2). Similar results are obtained if the vertical displacement Y1 and the second horizontal displacement X2 are both equal to zero and the absolute value of the non-zero second vertical displacement Y2 and the absolute value of the non-zero second vertical displacement Y2 and the absolute value of the non-zero horizontal displacement X1 are both smaller than the preset value. Alternatively, similar results are obtained if the vertical displacement Y1 and the second horizontal displacement X2 are both equal to zero and one of the absolute value of the non-zero second vertical displacement Y2 and the absolute value of the non-zero horizontal displacement X1 is smaller than the preset value.

After the plural sub-displacement data are obtained, one of the plural sub-displacement data is periodically transmitted from the wireless signal receiver 203 to the computer system 204 in every wired transmission time interval T2 until all of the sub-displacement data have been transmitted. For example, the wired transmission time interval T2 is 2 milliseconds. Under control of the second control unit 205, one of the plural sub-displacement data is periodically transmitted from the wireless signal receiver 203 to the computer system 204 in every wired transmission time interval T2.

In the data transmission method for use with the wireless mouse according to the present invention, the unassigned horizontal displacement and the unassigned vertical displacement are uniformly assigned to the horizontal reserve sub-displacements and the vertical reserve sub-displacements by respectively assigning the horizontal remainder and the vertical remainder. As a consequence, the horizontal sub-displacements and the vertical sub-displacements are distributed more closely. If the procedures of assigning the horizontal remainder and the vertical remainder are excluded, the unassigned horizontal displacement and the unassigned vertical displacement will be centralized to be assigned a specified horizontal reserve sub-displacement and a specified vertical reserve sub-displacement, and thus the moving trajectory of the wireless mouse will be composed of plural horizontal sub-displacements and plural vertical sub-displacements that are inconsistently distributed. Under this circumstance, the moving trajectory of the wireless mouse becomes non-linear. Whereas, by assigning the horizontal remainder and the vertical remainder, the moving trajectory of the wireless mouse becomes more linear and thus a smoother moving trajectory of the wireless is achieved.

From the above two embodiments, the data transmission method for use with the wireless mouse of the present invention is capable of increasing the wired report rate without largely increasing power consumption. Moreover, the moving trajectory of the wireless is smooth and linear. In comparison with the conventional technology, the data transmission method for use with the wireless mouse of the present invention has increased wired report rate when the same amount of electricity is consumed.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data transmission method for use with a wireless mouse, said wireless mouse comprising a wireless signal emitter and a wireless signal receiver, said wireless signal receiver being in communication with a computer system, said wireless mouse generating a mouse displacement data in response to a triggering operation by a user, said data transmission method comprising steps of:

periodically transmitting said mouse displacement data from said wireless signal emitter to said wireless signal receiver in every wireless transmission time interval T1, wherein said mouse displacement data includes a horizontal displacement and a vertical displacement;

partitioning said horizontal displacement and said vertical displacement of said mouse displacement data to acquire plural horizontal sub-displacements and plural vertical sub-displacements, respectively; and periodically transmitting one of said plural horizontal sub-displacements and one of said plural vertical sub-displacements from said wireless signal receiver to said computer system in every wired transmission time interval T2, wherein said wireless transmission time interval T1 is longer than said wired transmission time interval T2, wherein said step of acquiring said plural horizontal sub-displacements and said plural vertical sub-displacements comprises sub-steps of:

determining a partition value according to said horizontal displacement and said vertical displacement;

dividing said horizontal displacement by said partition value to obtain a horizontal quotient, a horizontal remainder and plural horizontal reserve sub-displacements, and dividing said vertical displacement by the partition value to obtain a vertical quotient, a vertical remainder and plural vertical reserve sub-displacements; and assigning said horizontal remainder to said plural horizontal reserve sub-displacements to obtain said plural horizontal sub-displacements, and assigning said vertical remainder to said plural vertical reserve sub-displacements to obtain said plural vertical sub-displacements.

2. The data transmission method according to claim 1 wherein if said horizontal displacement or said vertical displacement is equal to zero and the absolute value of said non-zero horizontal displacement or the absolute value of said non-zero vertical displacement is greater than or equal to a preset value, said partition value is equal to said preset value.

3. The data transmission method according to claim 1 wherein if said horizontal displacement or said vertical displacement is equal to zero and the absolute value of said non-zero horizontal displacement or the absolute value of said non-zero vertical displacement is smaller than a preset value, said partition value is equal to said non-zero horizontal displacement or said non-zero vertical displacement.

4. The data transmission method according to claim 1 wherein if the absolute value of said horizontal displacement and the absolute value of said vertical displacement are both greater than or equal to a preset value or the absolute value of said horizontal displacement and the absolute value of said vertical displacement are both smaller than said preset value, said partition value is equal to said preset value.

5. The data transmission method according to claim 1 wherein if the absolute value of said horizontal displacement is greater than or equal to a preset value and the absolute value of said vertical displacement is smaller than said preset value, said partition value is equal to said vertical displacement.

6. The data transmission method according to claim 1 wherein if the absolute value of said vertical displacement is greater than or equal to a preset value and the absolute value of said horizontal displacement is smaller than said preset value, said partition value is equal to said horizontal displacement.

7. A data transmission method for use with a wireless mouse, said wireless mouse comprising a wireless signal emitter and a wireless signal receiver, said wireless signal receiver being in communication with a computer system, said wireless mouse generating a mouse displacement data in response to a triggering operation by a user, said data transmission method comprising steps of:

periodically transmitting said mouse displacement data from said wireless signal emitter to said wireless signal receiver in every wireless transmission time interval T1, wherein said mouse displacement data includes a horizontal displacement and a vertical displacement;

partitioning said horizontal displacement and said vertical displacement of said mouse displacement data to acquire plural horizontal sub-displacements and plural vertical sub-displacements, respectively; and periodically transmitting one of said plural horizontal sub-displacements and one of said plural vertical sub-displacements from said wireless signal receiver to said computer system in every wired transmission time interval T2, wherein said wireless transmission time interval T1 is longer than said wired transmission time interval T2, wherein said wireless mouse further generates a second displacement data including a second horizontal displacement and a second vertical displacement, and said step of acquiring said plural horizontal sub-displacements and said plural vertical sub-displacements comprises sub-steps of:

combining said horizontal displacement and said second horizontal displacement as a combination horizontal displacement, combining said vertical displacement and said second vertical displacement as a combination vertical displacement, and determining a partition value according to said combination horizontal displacement and said combination vertical displacement;

dividing said combination horizontal displacement by said partition value to obtain a horizontal quotient, a horizontal remainder and plural horizontal reserve sub-displacements, and dividing said combination vertical displacement by the partition value to obtain a vertical quotient, a vertical remainder and plural vertical reserve sub-displacements; and assigning said horizontal remainder to said plural horizontal reserve sub-displacements to obtain said plural horizontal sub-displacements, and assigning said vertical remainder to said plural vertical reserve sub-displacements to obtain said plural vertical sub-displacements.

8. The data transmission method according to claim 7 wherein if the absolute values of said horizontal displacement and said second horizontal displacement are both greater than or equal to a preset value and the absolute values of said vertical displacement and said second vertical displacement are both ranged between zero and said preset value, said partition value is equal to said combination vertical displacement.

9. The data transmission method according to claim 7 wherein if the absolute values of said vertical displacement and said second vertical displacement are both greater than or equal to a preset value and the absolute values of said horizontal displacement and said second horizontal displacement are both ranged between zero and said preset value, said partition value is equal to said combination horizontal displacement.

10. The data transmission method according to claim 7 wherein if said horizontal displacement and said second vertical displacement are both equal to zero and said second horizontal displacement and said vertical displacement are not equal to zero, said data transmission method further includes a step of discriminating whether the absolute value of said second horizontal displacement and the absolute value of said vertical displacement are both greater than said preset value.

11. The data transmission method according to claim 10 wherein if the absolute value of said second horizontal displacement and the absolute value of said vertical displacement are both greater than said preset value, said partition value is equal to said preset value.

12. The data transmission method according to claim 10 wherein if the absolute value of said second horizontal displacement is greater than or equal to said preset value and the absolute value of said vertical displacement is smaller than said preset value, or if the absolute value of said second horizontal displacement and the absolute value of said vertical displacement are both smaller than said preset value and the absolute value of said second horizontal displacement is greater than the absolute value of said vertical displacement, said partition value is equal to said vertical displacement.

13. The data transmission method according to claim 10 wherein if the absolute value of said vertical displacement is greater than or equal to said preset value and the absolute value of said second horizontal displacement is smaller than said preset value, or if the absolute value of said second horizontal displacement and the absolute value of said vertical displacement are both smaller than said preset value and the absolute value of said vertical displacement is greater than the absolute value of said second horizontal displacement, said partition value is equal to said second horizontal displacement.

14. The data transmission method according to claim 7 wherein if said vertical displacement and said second horizontal displacement are both equal to zero and said second vertical displacement and said horizontal displacement are not equal to zero, said data transmission method further includes a step of discriminating whether the absolute value of said second vertical displacement and the absolute value of said horizontal displacement are both greater than said preset value.

15. The data transmission method according to claim 14 wherein if the absolute value of said second vertical displacement and the absolute value of said horizontal displacement are both greater than said preset value, said partition value is equal to said preset value.

16. The data transmission method according to claim 14 wherein if the absolute value of said second vertical displacement is greater than or equal to said preset value and the absolute value of said horizontal displacement is smaller than said preset value, or if the absolute value of said second vertical displacement and the absolute value of said horizontal displacement are both smaller than said preset value and the absolute value of said second vertical displacement is greater than the absolute value of said horizontal displacement, said partition value is equal to said horizontal displacement.

17. The data transmission method according to claim 14 wherein if the absolute value of said horizontal displacement is greater than or equal to said preset value and the absolute value of said second vertical displacement is smaller than said preset value, or if the absolute value of said second vertical displacement and the absolute value of said horizontal displacement are both smaller than said preset value and the absolute value of said horizontal displacement is greater than the absolute value of said second vertical displacement, said partition value is equal to said second vertical displacement.

18. The data transmission method according to claim 7 wherein said horizontal remainder is assigned according to said horizontal displacement and said second horizontal displacement, and said vertical remainder is assigned according to said vertical displacement and said second vertical displacement.

* * * * *